(12) United States Patent
Hochstetler et al.

(10) Patent No.: US 11,002,258 B2
(45) Date of Patent: May 11, 2021

(54) PORT PLATE FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 357 days.

(21) Appl. No.: 15/874,834

(22) Filed: Jan. 18, 2018

(65) Prior Publication Data

US 2019/0219041 A1    Jul. 18, 2019

(51) Int. Cl.
| | |
|---|---|
| *F16H 39/14* | (2006.01) |
| *F04B 1/2014* | (2020.01) |
| *F03C 1/34* | (2006.01) |
| *F02C 7/32* | (2006.01) |
| *F03C 1/06* | (2006.01) |
| *F04B 1/20* | (2020.01) |
| *F16H 48/10* | (2012.01) |

(52) U.S. Cl.
CPC .............. *F04B 1/2014* (2013.01); *F02C 7/32* (2013.01); *F03C 1/0639* (2013.01); *F03C 1/0655* (2013.01); *F04B 1/20* (2013.01); *F16H 39/14* (2013.01); *F16H 48/10* (2013.01); *F16H 2048/104* (2013.01)

(58) Field of Classification Search
CPC ........ F02C 7/32; F03C 1/0639; F03C 1/0655; F04B 1/20; F04B 1/2014; F16H 39/14
See application file for complete search history.

(56) References Cited

U.S. PATENT DOCUMENTS

| | | |
|---|---|---|
| 5,014,513 A | 5/1991 | Sundstrom |
| 2008/0098732 A1 | 5/2008 | Grosskopf et al. |
| 2014/0009126 A1 | 1/2014 | Vanderzyden et al. |
| 2016/0273359 A1* | 9/2016 | Campbell ............. F01B 3/0055 |

FOREIGN PATENT DOCUMENTS

EP           2636872        9/2013

OTHER PUBLICATIONS

The Extended European Search Report for EP Application No. 19152229.1, dated May 28, 2019.

* cited by examiner

*Primary Examiner* — Abiy Teka
(74) *Attorney, Agent, or Firm* — Carlson, Gaskey & Olds, P.C.

(57) ABSTRACT

A port plate for use in an integrated drive generator has a body defining a semi-cylindrical charge port communicating with two circumferentially smaller charge port portions. A diametrically opposed working pressure port has three smaller working pressure ports. A center plane is defined extending through a center axis of a bore within the body and equidistance between circumferential ends of the charge port and the working fluid port. A first angle is defined between the plane and a circumferential end of the smaller charge port. The first angle is between 15 and 25 degrees. An integrated drive generator and a method are also disclosed.

17 Claims, 5 Drawing Sheets

PORT PLATE FOR INTEGRATED DRIVE GENERATOR

BACKGROUND

This application relates to a port plate for use in a hydraulic unit of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the ring gear of the differential through an accessory drive gear.

Port plates as utilized in the hydraulic unit of an integrated drive generator face design challenges.

SUMMARY

A port plate for use in an integrated drive generator has a body defining a semi-cylindrical charge port communicating with two circumferentially smaller charge port portions. A diametrically opposed working pressure port has three smaller working pressure ports. A center plane is defined extending through a center axis of a bore within the body and equidistance between circumferential ends of the charge port and the working fluid port. A first angle is defined between the plane and a circumferential end of the smaller charge port. The first angle is between 15 and 25 degrees. An integrated drive generator and a method of replacing a port plate in an integrated drive generator are also disclosed and claimed.

These and other features may be best understood from the following drawings and specification.

DETAILED DESCRIPTION

Figure 1:
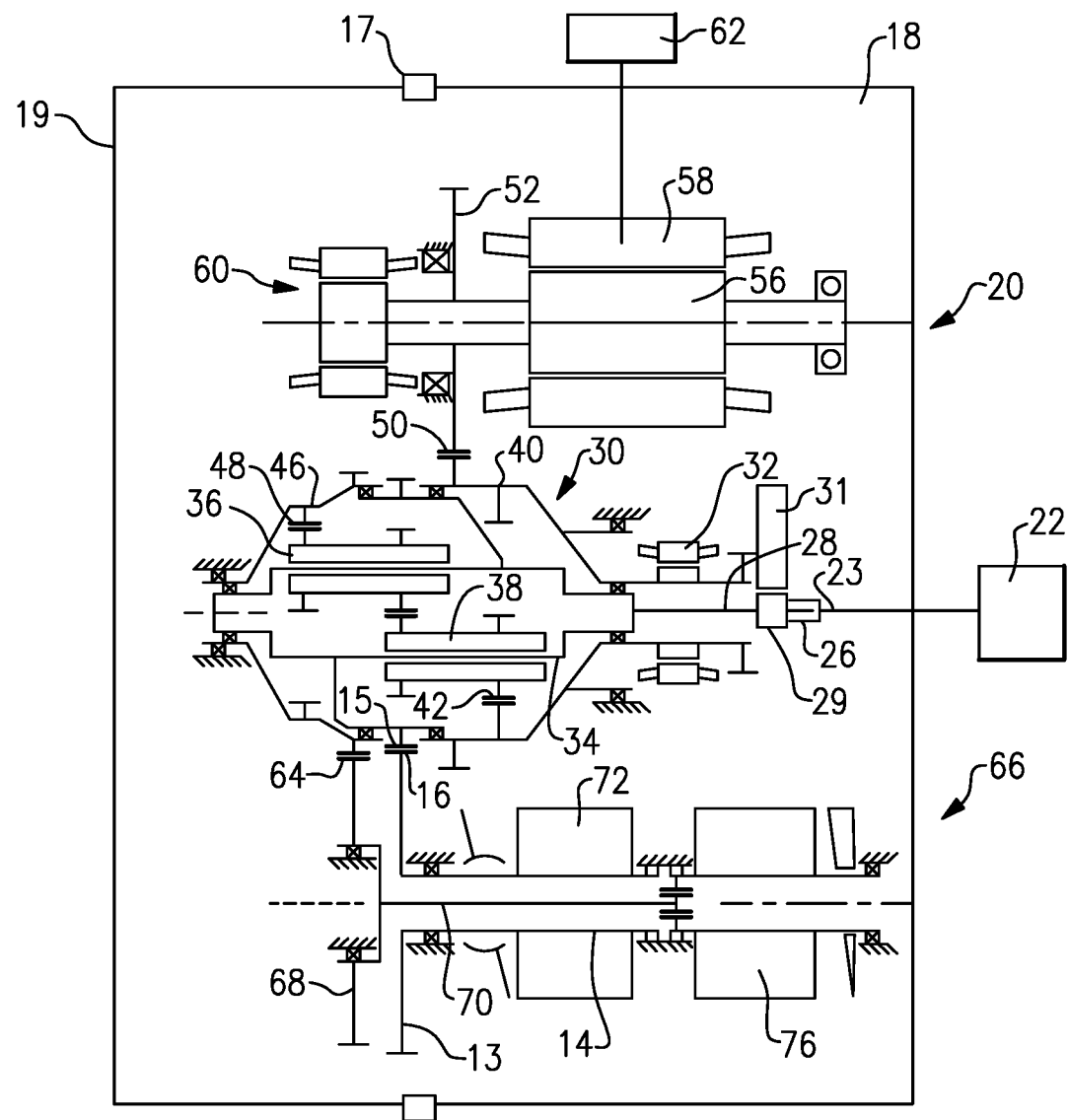
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
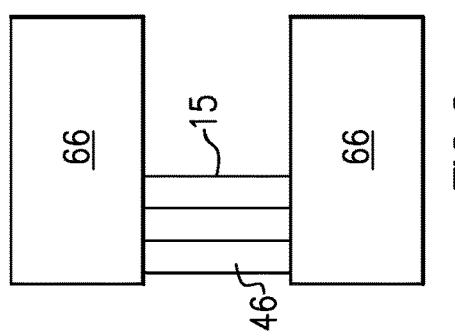
FIG. 2 schematically shows hydraulic units in the integrated drive generator.

FIG. 2 shows that there are a pair of hydraulic or speed trimming units 66 associated with a single ring gear 46 and a single carrier 15.

Figure 3:
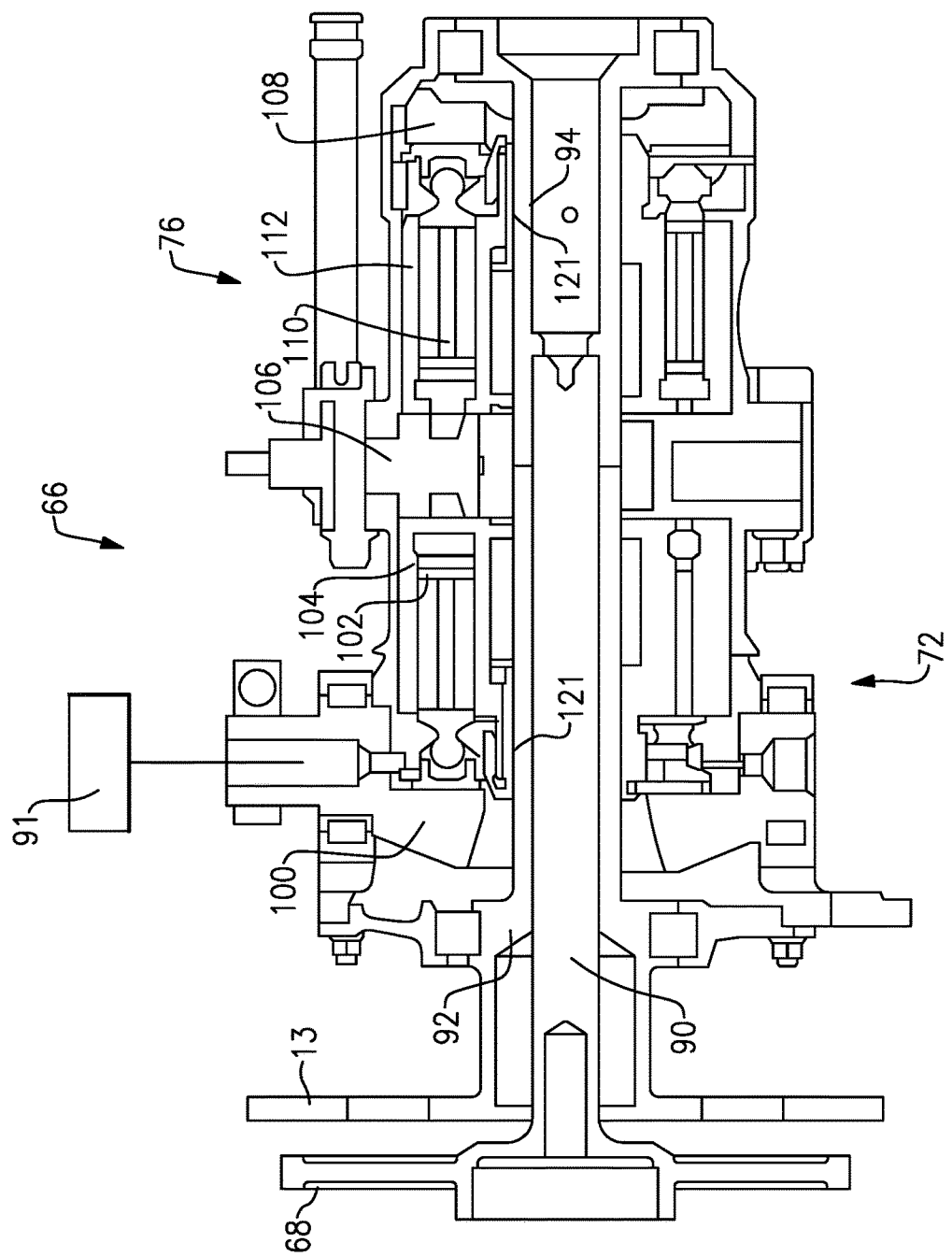
FIG. 3 shows the components of a hydraulic unit.

FIG. 3 shows details of the hydraulic unit 66. A speed into the gear 13 will be proportional to the speed from the input shaft 23. The gear 13 rotates with a shaft 92. The shaft 92 is supported on bearing 93. The shaft, through splined teeth 121, drives a cylinder block 104 to rotate.

The shaft 90 is called a fixed block shaft, although it rotates. The shaft 90 is supported on a bearing 132 received on a bearing race 130 on the fixed shaft 90. In addition, an inner race 134 for the bearing 132 is mounted on a housing 19. The inner race 134 includes a race surface 136.

A control 91 changes the position of a swash plate or wobbler 100 based upon the input speed seen at the generator. As the cylinder block 104 rotates, pistons 102 within the cylinder block cam off a surface of the swash plate 100. As the position of the swash plate 100 is changed by control 91, the amount of hydraulic fluid driven by the pistons 102, through a port plate 106, and against piston 110 in a cylinder block 112 changes. As the pistons 110 move, they cam off a surface of fixed swash plate or wobbler 108. This results in a control of a speed and direction of rotation of cylinder block 112. Cylinder block 112 has a spline connection at 121 to a shaft 94. Thus, the hydraulic unit 66 results in a desired speed and direction of rotation of the shaft 94, ultimately based upon the input speed seen at the generator. The shaft 94 drives the shaft 90 through spline connection 137 to in turn drive the gear 68. The gear 68 interacts with the trim ring gear 46 such that the ultimate speed leaving the differential 30 to the gear 52 is controlled to achieve a constant desired speed at the generator.

The cylinder blocks 104 and 112 are effectively identical. In addition, there are similar cylinder blocks 104/112 in both of the hydraulic units 66.

Figure 4:
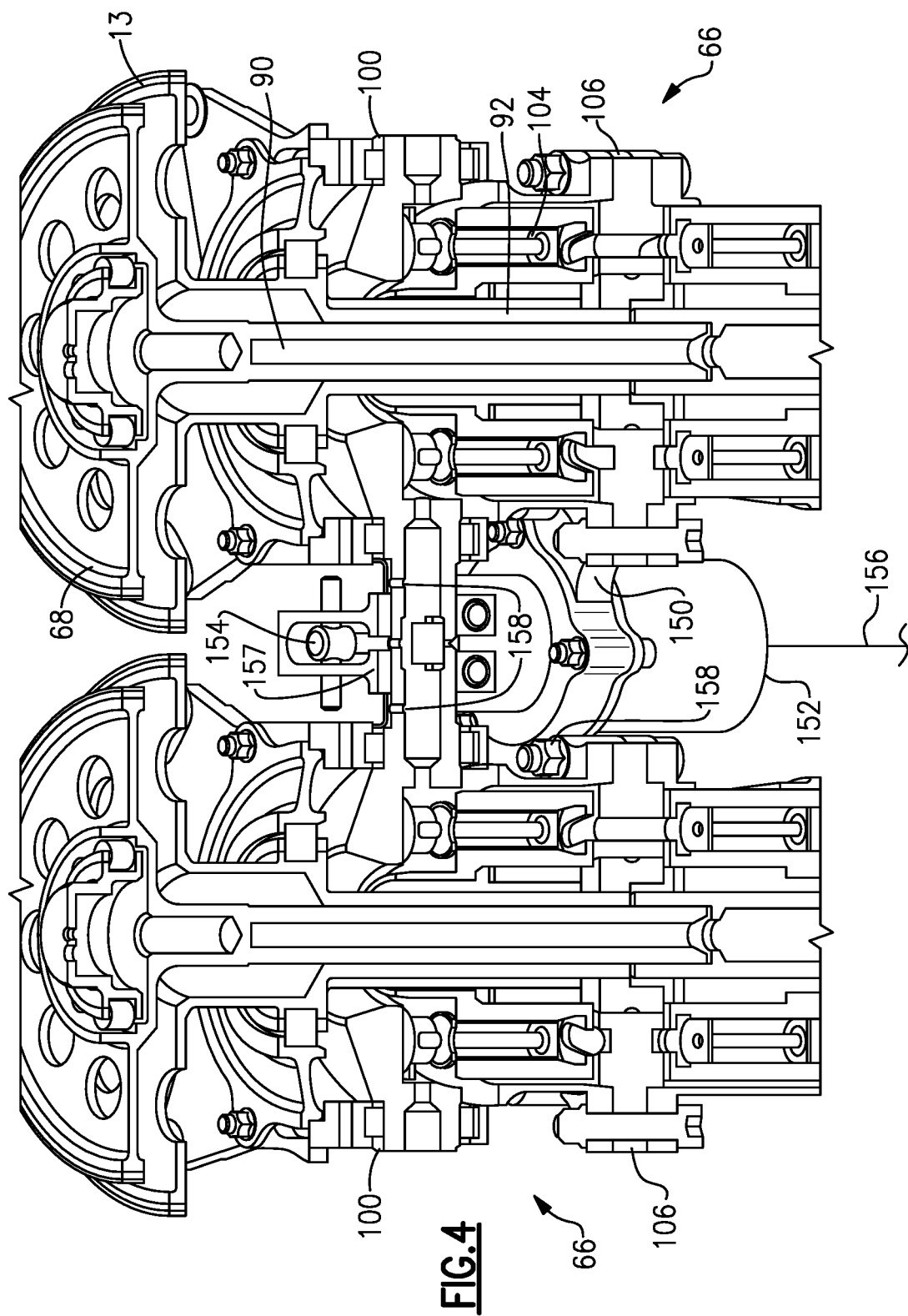
FIG. 4 shows details of the connection between the two hydraulic units in an integrated drive generator.

FIG. 4 shows details of the interconnection of the two hydraulic units 66. While it was stated that the components in the two hydraulic units are generally the same, there are certain differences. As one example, the port plates 106 in the two hydraulic units include one port 106 that includes a bracket mount 150 for receiving a hydraulic cylinder 152. Hydraulic cylinder 152 includes a piston 154, which is driven to pivot a lever 157 which cause pivot shaft portions 158 on the variable wobbler plates 100 to rotate some amount and, thus, change the orientation of the cam surfaces on the variable wobbler plates 100. A control 156 communicates fluid into the cylinder 152 such that the variable wobbler plates 100 are positioned to provide relatively constant speed to the generator.

Control 156 may be a governor, such as a mechanical flyball governor. In one example a rotating spool valve has a spool position controlled by centrifugal force. The control may be provided by flyweights rotating about a spool centerline and against a control spring.

It can also be seen that the shafts 158 on the two wobbler plates 100 extend in opposed directions from cam surfaces on the wobbler plates 100. That is, when the hydraulic units 66 are assembled, the two shaft portions extend towards each other. This is another example of how components in the two units differ.

Figure 5A:
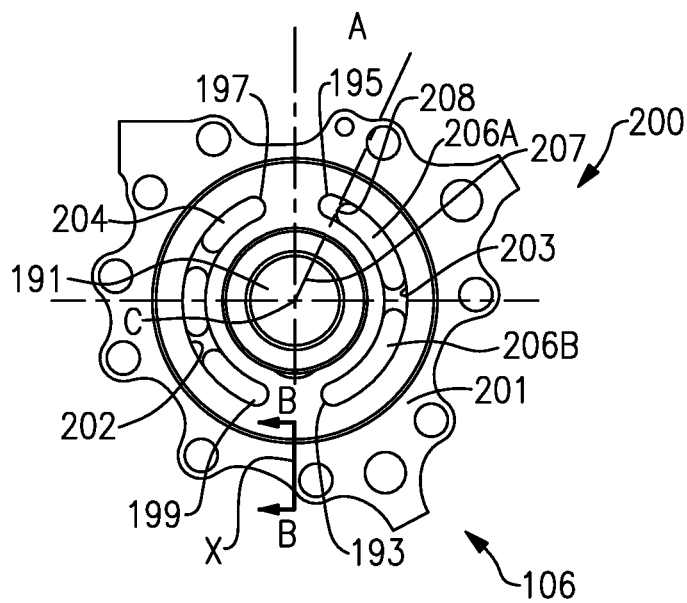
FIG. 5A shows a first embodiment port plate.
Figure 6A:
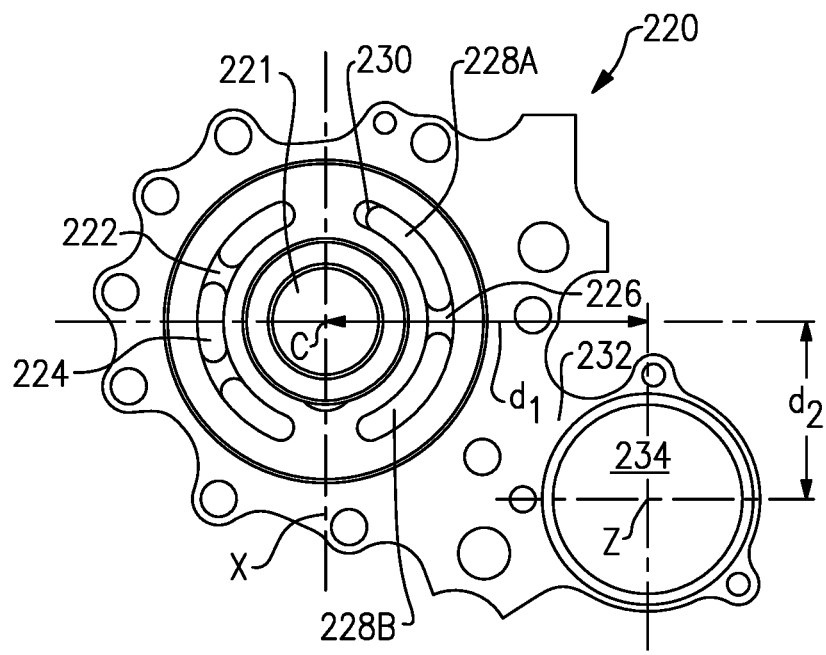
FIG. 6A shows a second embodiment.

FIG. 5A shows a first embodiment port plate 200 having a body 201. It should be understood that the port plate 200 would be utilized with one of the hydraulic units and a port plate 220 as shown in FIG. 6A would be utilized with the other hydraulic unit. Semi-cylindrical ports 202 and 203 are illustrated, and diametrically opposed to each other.

Port 203 is a charge port and communicates hydraulic fluid from the fixed wobbler plate side back to the variable wobbler plate side. Port 202 is a working fluid port and communicates the fluid from the variable wobbler plate side to the fixed wobbler plate side. Three smaller ports 204 are associated with the working fluid port 202. Two smaller ports 206A and 206B are associated with the charge port 203. The port 202 extends between circumferential ends 197 and 199. The port 203 extends between circumferential ends 193 and 195. A center plane X can be defined as extending midway, or equidistance, between ends 199 and 193 and ends 195 and 197 and through a center C of a bore 191. An angle A is defined from the plane X to a line 207 extending from a center point C and through an end point 208 of the port 206A. In one embodiment, angle A is 22.5 degrees. In embodiments, angle A is between 15 and 25 degrees.

Figure 5B:
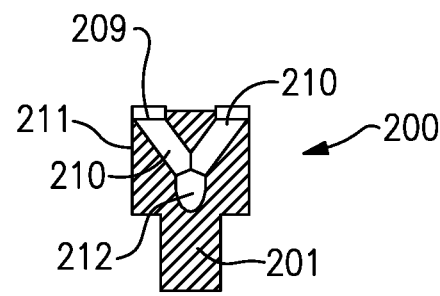
FIG. 5B is a line along line B-B of FIG. 5A.

FIG. 5B illustrates a shutdown drainage port that will be at a vertically lowermost location when the port plate 200 is mounted within an integrated drive generator. A pair of drain passages 210 extend from an inner end 209 and extend laterally inwardly from an outer side 211 until meeting at a drainage extending passage 212. Passage 212 drains oil that collects at the inner diameter of the cylinder block during operation.

Figure 5C:
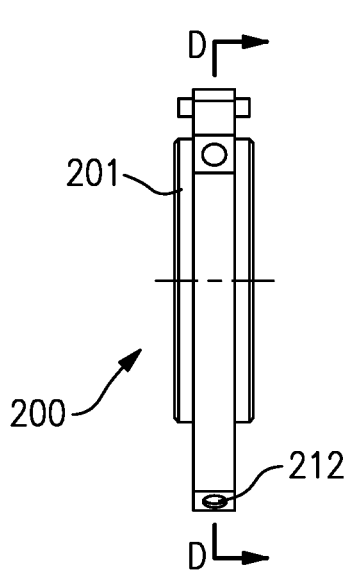
FIG. 5C is a side view of the first embodiment.

FIG. 5C shows a side view of the body 201 of port plate 200.

Figure 5D:
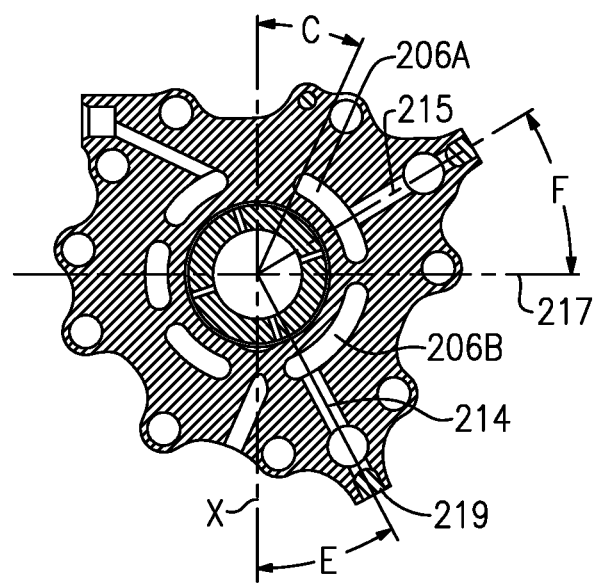
FIG. 5D is a cross-sectional view along line D-D of FIG. 5C.

FIG. 5D is a cross-sectional view along line D-D of FIG. 5C. As shown, the smaller port 206A communicates with a passage 215 leading to the charge pump. An angle F is defined bisecting passage 215 and between a line 217 which extends perpendicularly to the plane X. In one embodiment, angle F is 30.3 degrees.

An angle E is defined between the plane X and a line 219 passing through a center of the passage 214 communicating with smaller port 206B.

In embodiments, angle A is between 15 and 25 degrees, angle F is between 25 and 35 degrees, and angle E is between 23 and 33 degrees. In one embodiment, angle E is 27.7 degrees.

FIG. 6A shows a second port plate 220 in a similar view to FIG. 5A. Ports 222 and 226 function in a manner similar to the FIG. 5A embodiment as do the three smaller ports 224 and the two smaller ports 228A and 228B. The center axis C is also the center of a bore 221. The end point 230 of the smaller ports 228A is also spaced by the same angle as angle A in FIG. 5A. Further, there is a similar drainage port as in the FIG. 5A embodiment. However, in this embodiment, there is an extension 232 that provides a mount hole 234 to mount the cylinder as shown in FIG. 4. Hole 234 is centered on a point Z. Point Z is spaced from the center point C of the bore 221 and along a direction perpendicular to the axis X by a distance $d_1$. In one embodiment, $d_1$ was 2.994 inches (7.605 centimeters). The center point Z is also spaced from center point C by a distance $d_2$ along the plane X. In one embodiment, $d_2$ was 1.659 inches (4.214 centimeters). In embodiments, a ratio of $d_1$ to $d_2$ was between 1.70 and 1.90.

Figure 6B:
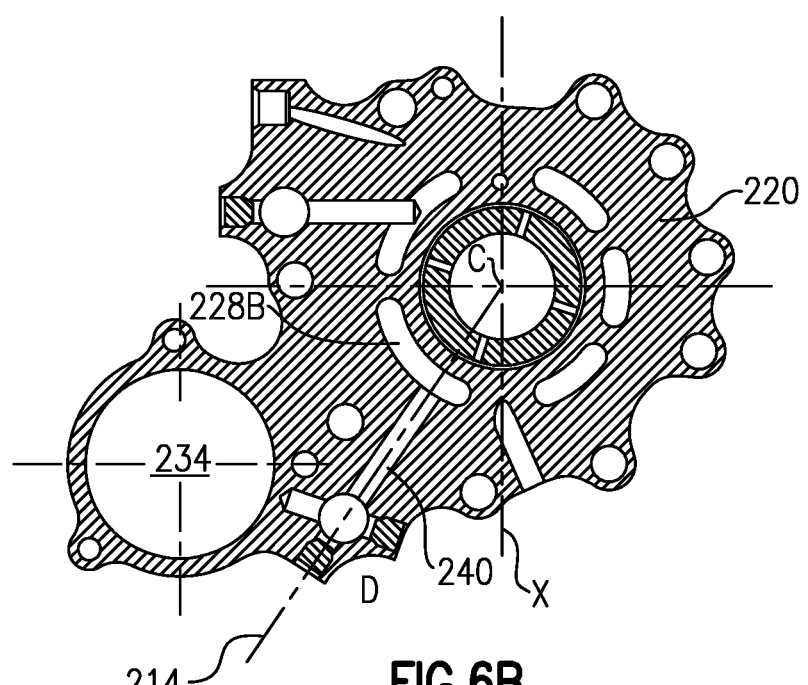
FIG. 6B is a cross-sectional view similar to that shown in FIG. 5D, but showing the second embodiment port plate.

FIG. 6B is a cross-sectional view showing further details and, in particular, a channel 240 connecting the smaller port 228B to the opening 234. In an embodiment, the channel 240 is spaced by an angle D from plane X. In one embodiment, angle D was 34.6 degrees. In embodiments, angle D is between 30 and 40.

A method of replacing a port plate in an integrated drive generator includes the steps of removing an existing port plate from an integrated drive generator having an input shaft connected to a differential. The differential is connected to a generator, and to a hydraulic unit. The hydraulic unit includes the existing variable wobbler plate and a fixed wobbler plate. Each of the wobbler plates are associated with a set of pistons. A fixed shaft is associated with the fixed wobbler plate, and connected to rotate by a cylinder block associated with the fixed wobbler plat. The fixed shaft includes a spline connection to drive a fixed block shaft. The fixed block shaft has gear teeth engaged to a ring gear in the differential. The existing port plate is positioned between the pistons associated with the fixed wobbler plate and the pistons associated with the variable wobbler plate.

The existing port plate is replaced with a replacement port plate having a body defining a semi-cylindrical charge port communicates with two circumferentially smaller charge port portions, and a diametrically opposed working pressure port having three smaller working pressure ports. A center plane is defined extending through a center axis of a bore within the body, and equidistance between circumferential ends of the charge port and the working fluid port. A first angle is defined between the plane and a circumferential end of the smaller charge port. The first angle is between 15 and 25 degrees.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A port plate for use in an integrated drive generator comprising:
   a body defining a semi-cylindrical charge port communicating with two circumferentially smaller charge port portions, and a diametrically opposed working pressure port having three smaller working pressure ports, and a center plane defined extending through a bore center axis of a bore within said body, and equidistance between circumferential ends of said charge port and said working pressure port, and a first angle defined between said plane and a circumferential end of one of said smaller charge ports, and said first angle being between 15 and 25 degrees; and
   wherein a drainage port is defined along said center plane, and said drainage port including a pair of passages extending from an inner surface of said body, and laterally outer sides of said body, laterally inwardly to meet at an extending passage.

2. The port plate as set forth in claim 1, wherein a second angle is defined between said center plane and a first channel communicating one of said smaller charge ports, with said second angle being between 25 and 35 degrees.

3. The port plate as set forth in claim 2, wherein a third angle is defined between a second channel communicating with a second of said smaller charge ports and between a line bisecting said second channel, and a second line extending from said center point perpendicular to said center plane, with said third angle being between 23 and 33 degrees.

4. The port plate as set forth in claim 3, wherein a fourth angle is defined between said center plane and a third channel communicating a second of said smaller charge ports to said mount hole, and said third angle being between 30 and 40 degrees.

5. The port plate as set forth in claim 1, wherein said port plate has an extension to include a mount hole for mounting a control cylinder.

6. The port plate as set forth in claim 5, wherein said mount hole is centered on a hole center axis and said hole center axis being spaced from said bore center axis by a first distance in a direction extending from said bore center axis perpendicularly to said center plane, and spaced by a second distance in a direction extending along said center plane, with a ratio of said first distance to said second distance being between 1.70 and 1.90.

7. An integrated drive generator comprising:
   an input shaft connected to a differential, said differential connected to a generator, and said differential also being connected to a hydraulic unit, said hydraulic unit including a variable wobbler plate and a fixed wobbler plate, and each of said wobbler plates being associated with a set of pistons, and a fixed shaft associated with said fixed shaft plate, and connected to rotate with a cylinder block associated with said fixed wobbler plate, and said fixed shaft including a spline connection to drive a fixed block shaft, said fixed block shaft having gear teeth engaged to a ring gear in said differential with a port plate between said pistons associated with said fixed wobbler plate and said pistons associated with said variable wobbler plate;
   said port plate having a body defining a semi-cylindrical charge port communicating with two circumferentially smaller charge port portions, and a diametrically opposed working pressure port having three smaller working pressure ports, and a center plane defined extending through a bore center axis of a bore within said body, and equidistance between circumferential ends of said charge port and said working fluid port, and a first angle defined between said plane and a circumferential end of one of said smaller charge ports, and said first angle being between 15 and 25 degrees; and
   wherein a drainage port is defined along said plane, and said drainage port including a pair of passages extending from an inner surface of said body, and laterally outer sides of said body, laterally inwardly to meet at an extending passage.

8. The integrated drive generator as set forth in claim 7, wherein a second angle is defined between said center plane and a first channel communicating to said one of said smaller charge ports, with said second angle being between 25 and 35 degrees.

9. The integrated drive generator as set forth in claim 8, wherein a third angle is defined between a second channel communicating with a second of said smaller charge ports and between a line bisecting said second channel, and a second line extending from said center point perpendicular to said center plane, with said third angle being between 23 and 33 degrees.

10. The integrated drive generator as set forth in claim 7, wherein said port plate has an extension to include a mount hole for mounting a control cylinder.

11. The integrated drive generator as set forth in claim 10, wherein a fourth angle is defined between said center plane and a third channel communicating said second of smaller charge ports to said mount hole, and said third angle being between 30 and 40 degrees.

12. The integrated drive generator ate as set forth in claim 10, wherein said mount hole is centered on a hole center axis and said hole center axis being spaced from said bore center axis by a first distance in a direction extending from said bore center axis perpendicularly to said center plane, and spaced by a second distance in a direction extending along said center place, with a ratio of said first distance to said second distance being between 1.70 and 1.90.

13. A method of replacing a port plate in an integrated drive generator comprising the steps of:

a) removing an existing port plate from an integrated drive generator having an input shaft connected to a differential, said differential connected to a generator, and said differential also being connected to a hydraulic unit, said hydraulic unit including said existing variable wobbler plate and a fixed wobbler plate, and each of said wobbler plates being associated with a set of pistons, and a fixed shaft associated with said fixed wobbler plate, and connected to rotate by a cylinder block associated with said fixed wobbler plate, and said fixed shaft including a spline connection to drive a fixed block shaft, said fixed block shaft having gear teeth engaged to a ring gear in said differential with said existing port plate positioned between said pistons associated with said fixed wobbler plate and said pistons associated with said variable wobbler plate;

b) replacing the existing port plate with a replacement port plate having a body defining a semi-cylindrical charge port communicating with two circumferentially smaller charge port portions, and a diametrically opposed working pressure port having three smaller working pressure ports, and a center plane defined extending through a center axis of a bore within said body, and equidistance between circumferential ends of said charge port and said working fluid port, and a first angle defined between said plane and a circumferential end of said smaller charge port, and said first angle being between 15 and 25 degrees; and wherein drainage port is defined along said center plane, and said drainage port including a pair of passages extending from an inner surface of said body, and laterally outer sides of said body, laterally inwardly to meet at a drainage passage.

14. The method of replacing a port plate as set forth in claim 13, wherein a second angle is defined between said center plane and a first channel communicating with said one of said smaller charge ports, with said second angle being between 20 and 30 degrees.

15. The method of replacing a port plate as set forth in claim 13, wherein a third angle is defined between a second channel communicating with a second of said smaller charge ports and between a line bisecting said second channel, and a second line extending from said center point perpendicular to said center plane, with said third angle being between 23 and 33 degrees.

16. The method of replacing a port plate as set forth in claim 13, wherein said port plate has an extension to include a mount hole for mounting a control cylinder, and a fourth angle is defined between said center plane and a third channel communicating a second of said smaller charge ports to said mount hole, and said third angle being between 30 and 40 degrees.

17. The method of replacing a port plate ate as set forth in claim 16, wherein said mount hole is centered on a hole center axis and said hole center axis being spaced from said bore center axis by a first distance in a direction extending from said bore center axis perpendicularly to said center plane, and spaced by a second distance in a direction extending along said center plane, with a ratio of said first distance to said second distance being between 1.70 and 1.90.

* * * * *